(12) United States Patent
Sekiya et al.

(10) Patent No.: US 7,282,009 B2
(45) Date of Patent: Oct. 16, 2007

(54) CONTROL OF LOCK-UP CLUTCH

(75) Inventors: Hiroshi Sekiya, Fuji (JP); Tatsuya Imamura, Fuji (JP); Koji Dohi, Fuji (JP); Kouji Saitou, Fuji (JP)

(73) Assignee: Jatco Ltd, Shizuoka (JP)

( * ) Notice: Subject to any disclaimer, the term of this patent is extended or adjusted under 35 U.S.C. 154(b) by 214 days.

(21) Appl. No.: 11/240,644

(22) Filed: Oct. 3, 2005

(65) Prior Publication Data
US 2006/0079376 A1 Apr. 13, 2006

(30) Foreign Application Priority Data
Oct. 7, 2004 (JP) ............................. 2004-294765

(51) Int. Cl.
*F16H 61/58* (2006.01)
*F16H 45/02* (2006.01)
*B60W 10/02* (2006.01)

(52) U.S. Cl. ........................... 477/64; 477/84; 477/169

(58) Field of Classification Search .................. 477/53, 477/62, 64, 65, 83, 84, 169, 174, 175, 180, 477/181; 701/55, 56, 67, 68
See application file for complete search history.

(56) References Cited

U.S. PATENT DOCUMENTS

| | | | |
|---|---|---|---|
| 5,332,073 A | | 7/1994 | Iizuka |
| 5,752,895 A | | 5/1998 | Sugiyama et al. |
| 5,906,556 A | * | 5/1999 | Harada et al. ................. 475/63 |
| 6,102,831 A | * | 8/2000 | Wakahara et al. ........... 477/169 |
| 6,139,466 A | * | 10/2000 | Nishino ........................ 477/65 |
| 6,860,834 B2 | | 3/2005 | Segawa et al. |
| 2005/0222737 A1 | * | 10/2005 | Imamura et al. ............... 701/67 |

FOREIGN PATENT DOCUMENTS

JP 2002-205576 A 7/2002

\* cited by examiner

*Primary Examiner*—Roger Pang
(74) *Attorney, Agent, or Firm*—Foley & Lardner LLP

(57) ABSTRACT

A lock-up clutch control device, which controls a lock-up clutch (6) installed in a torque converter (5) interposed between an engine (3) and a transmission (4) used with a vehicle, is disclosed. The lock-up clutch control device has a differential pressure generating device (7,8) which engages or disengages the lock-up clutch by adjusting a differential pressure supplied to the lock-up clutch, a sensor (13) which detects a vehicle speed, and a controller. The controller is programmed to: determine whether or not the vehicle speed is equal to or larger than a first threshold value (V1) corresponding to a lock-up ON vehicle speed; command the differential pressure generating device to engage the lock-up clutch, when the vehicle speed is equal to or larger than the first threshold value (V1); determine whether or not the vehicle speed has reached a second threshold value (V2) larger than the first threshold value (V1); set a lock-up OFF threshold value (V3/V4) which depends on whether the vehicle speed has reached the second threshold value (V2); and command the differential pressure generating device to disengage the lock-up clutch, when the vehicle speed is equal to or less than the lock-up OFF threshold value.

18 Claims, 3 Drawing Sheets

CONTROL OF LOCK-UP CLUTCH

FIELD OF THE INVENTION

This invention relates to a control device which controls the lock-up clutch of a torque converter.

BACKGROUND OF THE INVENTION

In a torque converter provided with a lock-up clutch, a lock-up clutch forward-reverse differential pressure (lock-up differential pressure) control engages and disengages the lock-up clutch. When the torque converter shifts from a converter state to the lock-up state, the lock-up differential pressure may gradually increase from a predetermined initial differential pressure. Namely, the torque converter shifts from a converter state to a lock-up state via a slip state. In the converter state, the lock-up clutch is not engaged, in the slip state, the lock-up clutch slips, and in the lock-up state, the lock-up clutch is completely engaged.

Tokkai Hei No. 2002-205576 published by the Japan Patent Office in 2004 discloses a control (lock-up control) of a lock-up clutch which performs lock-up from low speed and improves fuel consumption.

SUMMARY OF THE INVENTION

However, in the aforesaid prior art technology, even when the speed ratio (gear ratio) of an automatic transmission is changed to the Lo side to amplify the transmission torque, the lock-up state is maintained after start of the vehicle. For example, even when driving torque is insufficient when the vehicle comes to an uphill slope after the start of the vehicle, the lock-up clutch is rapidly engaged to increase the driving torque. This is because when the vehicle comes to an uphill slope immediately after the start of the vehicle, the transmission torque decreases, but oil pressure control of the lock-up clutch is open-loop control. If the vehicle then continues traveling up the uphill slope, the vehicle decelerates, and if it decelerates from above a booming noise generating speed to a booming noise generating speed region, a booming noise will occur. Here, booming noise is a noise which is generated at low vehicle speeds because of engine torque fluctuations being transmitted from the engine to the automatic transmission via the lock-up clutch, and is generated in the passenger compartment.

It is therefore an object of this invention to prevent generation of a booming noise.

In order to achieve the above object, this invention provides a lock-up clutch control device which controls a lock-up clutch installed in a torque converter interposed between an engine and a transmission used with a vehicle, comprising: a differential pressure generating device which engages or disengages the lock-up clutch by adjusting a differential pressure supplied to the lock-up clutch, a sensor which detects a vehicle speed, and a controller. The controller is programmed to: determine whether or not the vehicle speed is equal to or larger than a first threshold value corresponding to a lock-up ON vehicle speed; command the differential pressure generating device to engage the lock-up clutch, when the vehicle speed is equal to or larger than the first threshold value; determine whether or not the vehicle speed has reached a second threshold value larger than the first threshold value; set a lock-up OFF threshold value which depends on whether the vehicle speed has reached the second threshold value; and command the differential pressure generating device to disengage the lock-up clutch, when the vehicle speed is equal to or less than the lock-up OFF threshold value.

In order to achieve the above object, this invention further provides a lock-up clutch control method for controlling a lock-up clutch installed in a torque converter interposed between an engine and a transmission used with a vehicle. The lock-up clutch control method comprises: detecting a vehicle speed; determining whether or not the vehicle speed is equal to or larger than a first threshold value corresponding to a lock-up ON vehicle speed; commanding a differential pressure generating device to engage the lock-up clutch, when the vehicle speed is equal to or larger than the first threshold value; determining whether or not the vehicle speed has reached a second threshold value larger than the first threshold value; setting a lock-up OFF threshold value which depends on whether the vehicle speed has reached the second threshold value; and commanding the differential pressure generating device to disengage the lock-up clutch, when the vehicle speed is equal to or less than the lock-up OFF threshold value.

The details as well as other features and advantages of this invention are set forth in the remainder of the specification and are shown in the accompanying drawings.

BRIEF DESCRIPTION OF THE DRAWINGS

FIG. 2 describes the details of the control performed by an AT controller.

DESCRIPTION OF THE PREFERRED EMBODIMENTS

Figure 1:
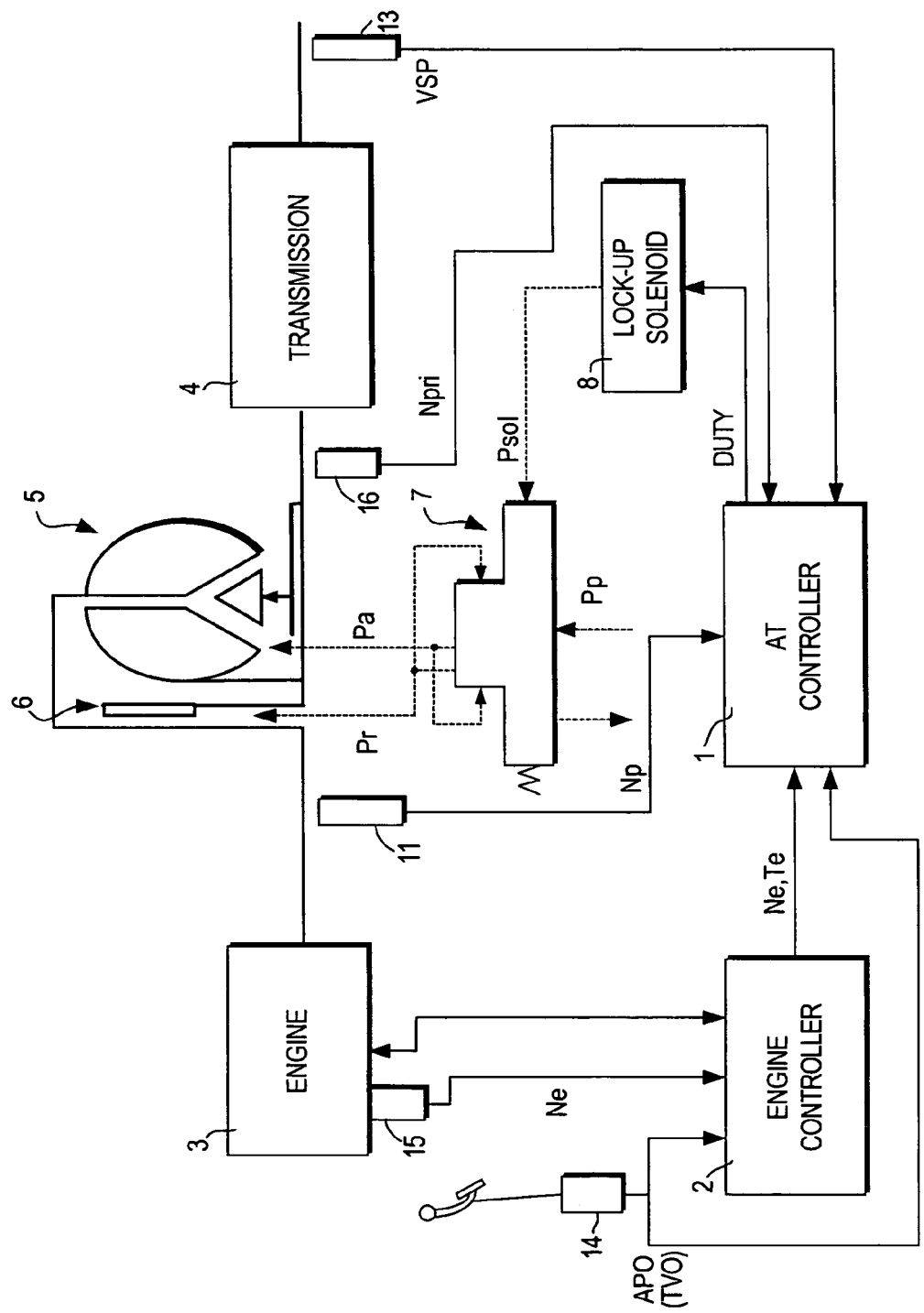
FIG. 1 is a schematic view of a vehicle provided with an automatic transmission and a torque converter according to one embodiment.

FIG. 1 shows a vehicle in which is mounted an automatic transmission according to this embodiment. An engine 3 is coupled to a torque converter 5 and the torque converter 5 is coupled to the automatic transmission 4. The torque converter 5 comprises a lock-up clutch 6. The lock-up clutch 6 is selectively brought to a lock-up state (engaged state), a slip state, or an unlock-up state (disengaged state) in accordance with the operational status of the vehicle. The torque converter 5 has incorporated therein the lock-up clutch 6 which is rotated along with a torque converter output element (turbine).

When the lock-up clutch 6 is locked to a torque converter input element (impeller), the torque converter 5 is brought to the lock-up state where the input and output elements are directly coupled to each other.

The lock-up clutch 6 is operated in accordance with a differential pressure Pa-Pr between a torque converter apply pressure Pa and a torque converter release pressure Pr at both sides (the front and rear) of the lock-up clutch 6. When the release pressure Pr is higher than the apply pressure Pa, the lock-up clutch 6 is disengaged, thus direct coupling is not made between the torque converter input and output elements. When the release pressure Pr is much lower than the apply pressure Pa, the lock-up clutch 6 is locked, and direct coupling is made between the torque converter input and output elements.

When locking the lock-up clutch 6, a locking force, i.e. a lock-up capacity, of the lock-up clutch 6 is determined by the differential pressure Pa-Pr. The larger the differential pressure, the more the locking force of the lock-up clutch 6 increases, thereby increasing the lock-up capacity.

The differential pressure Pa-Pr is controlled by a lock-up control valve 7 which is generally known. The lock-up control valve 7 is, for example, disclosed in U.S. Pat. No. 6,860,834 granted to Segawa, et al. on Mar. 1, 2005, U.S. Pat. No. 5,332,073 granted to Iizuka on Jul. 26, 1994, or U.S. Pat. No. 5,752,895 granted to Sugiyama et al. on May 19, 1998.

According to this embodiment, a lock-up solenoid valve 8 uses a pump pressure Pp as the original pressure to create a signal pressure Psol applied to the lock-up control valve 7 in response to a duty signal DUTY. The lock-up control valve 7 supplies the apply pressure Pa and release pressure Pr to the lock-up clutch 6 according to the signal pressure Psol input from the lock-up solenoid valve 8. In the lock-up control valve 7, the apply pressure Pa and the release pressure Pr act to oppose each other. Further, a biasing force of a spring is added in the same direction as the apply pressure Pa, a biasing force of a spring is added in the same direction as the release pressure Pr, and at the same time the signal pressure Psol is applied in the same direction as the release pressure Pr. The lock-up control valve 7 determines the differential pressure Pa-Pr such that these oil pressures and the biasing forces of the springs are balanced. The lock-up solenoid valve 8 and the lock-up control valve 7 constitute a differential pressure generator which generates a differential pressure added to the lock-up clutch.

An AT (automatic transmission) controller 1 constituted by a microcomputer and the like determines the duty signal DUTY in accordance with the operational status of the vehicle, and controls the differential pressure Pa-Pr by sending the duty signal DUTY to the lock-up solenoid valve 8. The AT controller 1 comprises a microcomputer having a central processing unit (CPU), a random access memory (RAM), a read-only memory (ROM), an input/output (I/O) interface, and a timer. The read-only memory (ROM) may be a programmable ROM.

The AT controller 1 receives signals that indicate a running state of the vehicle and an operational state of the driver. For example, these signals are signals that indicate an input shaft rotational speed Npri of the transmission 4, which is detected by an input shaft rotation sensor 16, a pump impeller rotational speed Np detected by an impeller rotation sensor 11, an accelerator pedal stroke APO (or an opening of a throttle valve TVO) detected by an accelerator pedal stroke sensor 14, and a vehicle speed VSP detected by a vehicle speed sensor 13. The input shaft of the transmission 4 corresponds to an output shaft of the torque converter 5, and the rotational speed of the input shaft of the transmission 4 is equivalent to the rotational speed of the output shaft of the torque converter 5. The pump impeller rotational speed Np is equivalent to an input rotational speed (=engine speed Ne) inputted to the torque converter 5. Further, the AT controller 1 receives signals indicative of the engine speed Ne and engine torque Te from an engine controller 2. The AT controller 1 controls locking, release, or slippage of the lock-up clutch 6 by means of these signals. The engine speed Ne is detected by an engine speed sensor 15 and is input to the engine controller 2.

The engine controller 2 comprises a microcomputer having a central processing unit (CPU), a random access memory (RAM), read-only memory (ROM), and an input/output (I/O) interface. The engine controller 2 and the AT controller 1 may be integrated to be a single controller.

The AT controller 1 performs smooth lock-up ON control according to the operational status of the vehicle. This smooth lock-up ON control is control which engages the lock-up clutch 6 from the converter state via the slip state when, for example, there is little change of the throttle valve opening TVO, and the vehicle speed VSP increases gently. Here, the throttle valve is a valve which adjusts an air flowrate supplied to the engine 3.

This embodiment relates to an automatic transmission which performs lock-up from a low speed after start of the vehicle. For example, to complete lock-up at a vehicle speed VSP=20 Km/hour, smooth lock-up ON control starts near a vehicle speed VSP=5 Km/hour immediately after starting of the vehicle. In this embodiment, generating of the booming noise in the lock-up state during deceleration is prevented.

Figure 2:
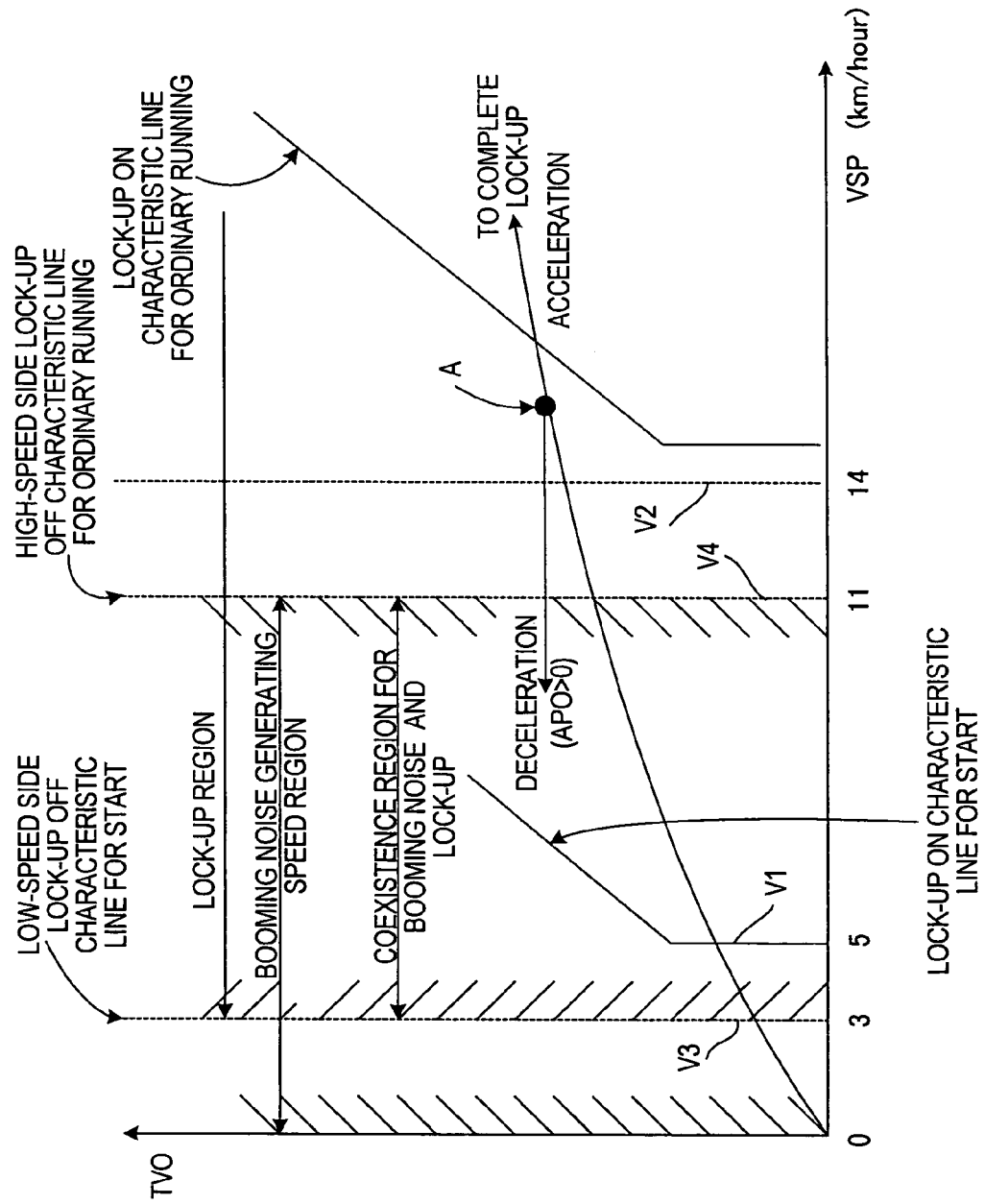
FIG. 2 is a look-up map defining a lock-up ON characteristic line which specifies a vehicle speed at which smooth lock-up ON control is started as a function of throttle valve opening TVO, and defining a lock-up OFF characteristic line which specifies a vehicle speed at which lock-up OFF control is started as a function of throttle valve opening TVO.

Referring to FIG. 2, the conditions in relation to the throttle valve opening TVO and vehicle speed VSP under which booming noise is generated, will be described. The booming noise is generated at a speed less than a low speed, for example, 11 Km/hour or less. Smooth lock-up ON control is performed at 5 km/hour or more. In other words, the booming noise generating speed region and the lock-up region overlap with each other.

A lock-up ON characteristic line showing the beginning of a smooth lock-up control state, puts the lock-up clutch into an engaged state during starting (acceleration) of the vehicle, and a lock-up OFF characteristic line showing the beginning of a converter state puts the lock-up clutch into a disengaged state during stopping (deceleration) of the vehicle.

The AT controller 1 may store these characteristic lines as a function, a look-up map, or a look-up table. The smooth lock-up ON characteristic line which shows the start of smooth lock-up ON control, defines a relation between the opening TVO of the throttle valve and the vehicle speed VSP at which smooth lock-up ON control is started. The smooth lock-up ON characteristic line is set so that control to engage the lock-up clutch 6 starts at a vehicle speed VSP=V1 (for example, 5 Km/hour) during acceleration. On the other hand, the lock-up OFF characteristic line which shows the end of smooth lock-up ON control defines a relation between the opening TVO of the throttle valve and the speed VSP at which lock-up OFF control is started.

The lock-up OFF characteristic line is set to start control which disengages the lock-up clutch 6 at a speed VSP=V3 (for example, 3 Km/hour) during deceleration. The disengaging of the lock-up clutch 6 prevents the engine from stalling. To simplify the description, the lock-up ON/OFF characteristic line at these very low speeds is referred to as a low-speed side lock-up ON/OFF line (first lock-up ON/OFF characteristic line).

When the accelerator pedal is depressed from the stop state, the vehicle starts and accelerates, and when the vehicle speed VSP exceeds V1 (for example, 5 Km/hour), smooth lock-up ON control is started and the differential pressure Pa-Pr increases. Subsequently, the acceleration state is maintained, and lock-up is completed at a vehicle speed of, for example, VSP=20 Km/hour. However, after the vehicle speed exceeds a speed V4 (for example, 11 Km/hour) below which booming noise is generated before lock-up is completed, running resistance may increase for example on a uphill road and vehicle speed may decrease. The vehicle speed VSP may then enter the booming noise generating speed region, and booming noise may occur. In FIG. 2, the change-over from the acceleration state to the deceleration state is shown by a point A.

Here, to prevent booming noise, it is possible to set the start speed of lock-up OFF control to exceed the vehicle speed VSP=11 Km/hour at which booming noise is not generated. In this case, however, since the smooth lock-up ON characteristic line is also changed over to the high speed side, the lock-up region goes to higher speed which is not desirable from the viewpoint of fuel consumption reduction.

In this embodiment, only the lock-up OFF characteristic line is changed over between a low-speed side characteristic line for start and a high-speed side characteristic line for ordinary running (not for vehicle start), depending on the vehicle speed. The smooth lock-up ON characteristic line is not changed over, but is maintained. Hence, while generation of booming noise is prevented, fuel consumption improves.

Specifically, lock-up control is turned ON at a vehicle speed VSP=V1 (for example, 5 Km/hour) when the vehicle starts and accelerates. The low-speed side lock-up OFF characteristic line for start is provided as a line VSP=V3 (=3 Km/hour), and the high-speed side lock-up characteristic line for ordinary running is located at a higher vehicle speed than the low-speed side lock-up OFF characteristic line. Here, the high-speed side lock-up OFF characteristic line with the vehicle speed V4 (=11 Km/hour) set for ordinary running, is located at an upper limit of the booming noise generating speed region. However, this vehicle speed V4 (fourth threshold value) is not limited, and may be a value obtained by adding a fixed value to the upper limiting speed of the booming noise generating speed region.

A vehicle speed (second threshold speed) V2 at which the low-speed side lock-up OFF characteristic line is changed over to the high-speed side lock-up OFF characteristic line, is a speed obtained by adding a value (for example, 3 Km/hour) corresponding to the hysteresis for preventing hunting during control, to the upper limiting speed V4 (=11 Km/hour) of the booming noise generating speed region.

After the vehicle has started, when smooth lock-up ON control is performed, the low-speed side lock-up OFF characteristic line for start changes over to the high-speed side lock-up OFF characteristic line at a vehicle speed VSP of V2 (=14 km/hour). When the vehicle enters a deceleration state due to the vehicle climbing a hill road, and the vehicle speed VSP decelerates to V4 (=11 Km/hour), the lock-up clutch is disengaged by high-speed side lock-up OFF control for ordinary running. Hence, the change-over from lock-up OFF control for start to lock-up OFF control for ordinary running, is performed at a higher speed than the booming noise generating speed region. Since the lock-up OFF start speed for ordinary running is set to be equal to or larger than the upper limiting vehicle speed of the booming noise generating speed region, the torque converter 6 is disengaged at the upper limiting vehicle speed of the booming noise generating speed region, and generation of booming noise is prevented.

If the vehicle enters a deceleration state at a vehicle speed VSP less than the second threshold value V2 (=14 Km/hour), smooth lock-up ON control for start is continued. If the deceleration state of the vehicle continues and the vehicle speed VSP is less than the lock-up OFF start vehicle speed VSP (=3 Km/hour), engine stall is prevented by lock-up OFF control for start. In this case, engine stall can be prevented although generation of booming noise cannot be prevented.

Figure 3:
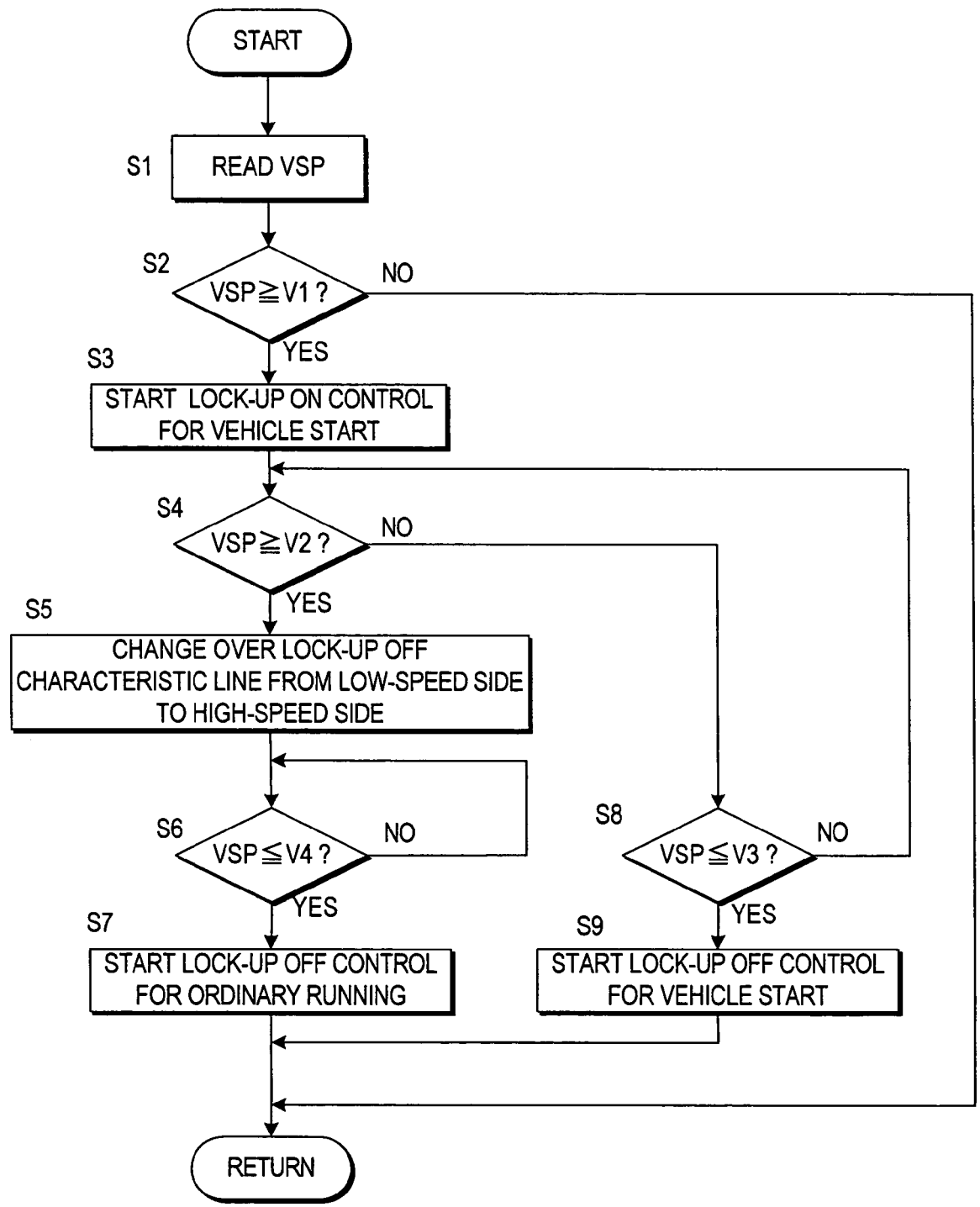
FIG. 3 is a flow chart showing an example of the lock-up ON/OFF control performed by the AT controller.

Next, a flow chart showing the control routine (control program) of the lock-up ON/OFF control performed by the AT controller 1, will be described referring to FIG. 3. This control routine is repeatedly performed by an interrupt at a predetermined interval (for example, several tens of milliseconds), after the accelerator pedal is depressed (i.e., after the throttle valve opening TVO becomes larger than a predetermined value near zero). During execution of the control routine, interruption may be prohibited. The control routine may be stored in a ROM of the AT controller 1 as a program.

In a step S1, the vehicle speed VSP is detected and read using the vehicle speed sensor 13, and it is determined whether or not the vehicle is in an acceleration state. When the present vehicle speed has increased from the value read on the immediately preceding execution of the step S1, the vehicle is in an acceleration state.

Next, in a step S2, it is determined whether or not the detected vehicle speed VSP is equal to or larger than a first threshold value V1 (for example, 5 Km/hour) while the vehicle is in an acceleration state. If the vehicle speed VSP is equal to or larger than V1 in the acceleration state, the routine proceeds to S3. If the vehicle speed VSP is smaller than V1, or the vehicle is in a deceleration state, the routine is terminated. Here, the first threshold value V1 is a vehicle speed set by the smooth lock-up ON characteristic line for start, and is a speed which starts smooth lock-up ON control for vehicle start. The first threshold value V1 may be referred to as a lock-up ON threshold value.

In the step S3, to start smooth lock-up ON control for start, a duty signal is transmitted to the lock-up solenoid valve 8 so that the differential pressure Pa-Pr starts to increase.

Next, in a step S4, it is determined whether or not the vehicle speed VSP under smooth lock-up ON control for start is larger than a second threshold value V2 (for example, 14 Km/hour). The second threshold value V2 is larger than or equal to the first threshold value V1 (for example, 5 Km/hour). If the detected present vehicle speed VSP is larger than or equal to the second threshold value V2, the routine proceeds to a step S5. On the other hand, if the present vehicle speed VSP is less than V2, the routine proceeds to a step S8. The second threshold value V2 is a value obtained by adding a speed corresponding to hysteresis to the upper limiting speed at which booming noise is generated.

In the step S5, the lock-up OFF characteristic line is changed over from the low-speed side lock-up OFF characteristic line for vehicle start, to the high-speed side lock-up OFF characteristic line for ordinary running.

Next, in a step S6, it is determined whether or not the detected present vehicle speed VSP is equal to or less than a fourth threshold value V4 (for example, 11 Km/hour). The fourth threshold value may be referred to as a lock-up OFF threshold value for ordinary running.

The fourth threshold value V4 is larger than the first threshold value V1, and smaller than the second threshold value V2. If the present vehicle speed VSP is equal to or less than the fourth threshold value V4, the routine proceeds to a step S7. If the present vehicle speed VSP is larger than the fourth threshold value V4, the routine returns to the step S6, the routine waits until the present vehicle speed VSP is equal to or less than the fourth threshold value V4, and smooth lock-up ON control is continued.

In the step S7, the lock-up clutch is disengaged by lock-up OFF control for ordinary running. Due to this, when the vehicle speed decelerates from the vehicle speed VSP detected in the step S4 due to insufficient engine torque, e.g., when climbing a hill road, and it reaches the speed region in which booming noise is generated (i.e., equal to or less than the vehicle speed V4), the lock-up clutch 6 is disengaged and generation of booming noise is prevented.

In a step S8, it is determined whether or not the detected present vehicle speed VSP is less than a third threshold value V3 (for example, 3 Km/hour). The third threshold value may be referred to as a lock-up OFF threshold value for start. If the present vehicle speed VSP is equal to or less than the third threshold value V3, the routine proceeds to a step S9. If the present vehicle speed VSP is larger than V3, the routine returns to the step S4, steps S4 and S8 are repeated, and smooth lock-up ON control for start is continued. Here, the third threshold value V3 is a threshold value for starting disengagement control of the lock-up clutch according to lock-up OFF control for start. Usually, the third threshold value V3 is set lower than the first threshold value V1, and is set to prevent engine stall.

In the step S9, disengagement control of the lock-up clutch is started by lock-up OFF control for start.

In the above routine, the throttle valve opening TVO may be detected and the threshold values V1-V4 may be set depending on the detected throttle valve opening TVO. Namely, the threshold values V1-V4 may be depend on the throttle valve opening TVO.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The entire contents of Japanese Patent Application P2004-294765 (filed Oct. 7, 2004) are incorporated herein by reference.

What is claimed is:

1. A lock-up clutch control device which controls a lock-up clutch installed in a torque converter interposed between an engine and a transmission used with a vehicle, comprising:
a differential pressure generating device which engages or disengages the lock-up clutch by adjusting a differential pressure supplied to the lock-up clutch,
a sensor which detects a vehicle speed, and
a controller programmed to:
determine whether or not the vehicle speed is equal to or larger than a first threshold value (V1) corresponding to a lock-up ON vehicle speed;
command the differential pressure generating device to engage the lock-up clutch, when the vehicle speed is equal to or larger than the first threshold value (V1);
determine whether or not the vehicle speed has reached a second threshold value (V2) larger than the first threshold value (V1);
set a lock-up OFF threshold value (V3/V4) which depends on whether the vehicle speed has reached the second threshold value (V2); and
command the differential pressure generating device to disengage the lock-up clutch, when the vehicle speed is equal to or less than the lock-up OFF threshold value.

2. The lock-up clutch control device as defined in claim 1, wherein the lock-up OFF threshold value (V3/V4) is smaller than the second threshold value (V2).

3. The lock-up clutch control device as defined in claim 1, wherein the controller is further programmed to:

set the lock-up OFF vehicle speed to a third threshold value (V3), when the vehicle speed has not reached the second threshold value (V2); and
set the lock-up OFF vehicle speed to a fourth threshold value (V4) larger than the third threshold value, when the vehicle speed has reached the second threshold value (V2).

4. The lock-up clutch control device as defined in claim 3, wherein the fourth threshold value (V4) is larger than the first threshold value (V1).

5. The lock-up clutch control device as defined in claim 3, wherein the third threshold value (V3) is smaller than the first threshold value (V1).

6. The lock-up clutch control device as defined in claim 1, comprising a sensor which detects an opening (TVO) of a throttle valve which adjusts an air flowrate supplied to the engine,
wherein the controller is programmed to:
when the opening of the throttle valve is larger than a predetermined value near zero, determine whether or not the vehicle speed is equal to or larger than the first threshold value (V1), and determine whether or not the vehicle speed has reached the second threshold value (V2) which is larger than the first threshold value (V1).

7. The lock-up clutch control device as defined in claim 1, wherein the controller is programmed to:
determine whether or not the vehicle is in an acceleration state based on the detected speed,
and when the vehicle is in an acceleration state and the vehicle speed is equal to or larger than the first threshold value (V1), command the differential pressure generating device to engage the lock-up clutch.

8. The lock-up clutch control device as defined in claim 1, wherein the first threshold value (V1) is set according to a vehicle speed at which engagement of the lock-up clutch is completed.

9. The lock-up clutch control device as defined in claim 1, wherein the second threshold value (V2) is larger than the vehicle speed at which booming noise is generated.

10. The lock-up clutch control device as defined in claim 1, wherein the second threshold value (V2) is a vehicle speed obtained by adding a predetermined vehicle speed to an upper limiting value of vehicle speed at which booming noise is generated.

11. The lock-up clutch control device as defined in claim 1, wherein the third threshold value (V3) is equal to or larger than the vehicle speed at which engine stall occurs.

12. The lock-up clutch control device as defined in claim 1, wherein the fourth threshold value (V4) is the upper limiting value of vehicle speed at which booming noise is generated.

13. The lock-up clutch control device as defined in claim 1, comprising a sensor which detects the opening (TVO) of a throttle valve,
wherein the controller is programmed to set the first threshold value (V1) according to the opening (TVO) of the throttle valve.

14. The lock-up clutch control device as defined in claim 1, comprising a sensor which detects the opening (TVO) of a throttle valve which adjusts an air flowrate supplied to the engine,
wherein the controller is programmed to set the second threshold value (V2) according to the opening (TVO) of the throttle valve.

15. The lock-up clutch control device as defined in claim 1, comprising a sensor which detects the opening (TVO) of a throttle valve which adjusts an air flowrate supplied to the engine, wherein the controller is programmed to set the third threshold value (V3) according to the opening (TVO) of the throttle valve.

16. The lock-up clutch control device as defined in claim 1, comprising a sensor which detects the opening (TVO) of a throttle valve which adjusts an air flowrate supplied to the engine, wherein the controller is programmed to set the fourth threshold value (V4) according to the opening (TVO) of the throttle valve.

17. A lock-up clutch control device which controls a lock-up clutch installed in a torque converter interposed between an engine and a transmission used with a vehicle, comprising:

differential pressure generating means for engaging or disengaging the lock-up clutch by adjusting a differential pressure supplied to the lock-up clutch;

detecting means for detecting a vehicle speed;

determining means for determining whether or not the vehicle speed is equal to or larger than a first threshold value (V1) corresponding to a lock-up ON vehicle speed;

commanding means for commanding the differential pressure generating means to engage the lock-up clutch, when the vehicle speed is equal to or larger than the first threshold value (V1);

determining means for determining whether or not the vehicle speed has reached a second threshold value (V2) larger than the first threshold value (V1);

setting means for setting a lock-up OFF threshold value (V3/V4) which depends on whether the vehicle speed has reached the second threshold value (V2); and commanding means for commanding the differential pressure generating means to disengage the lock-up clutch, when the vehicle speed is equal to or less than the lock-up OFF threshold value.

18. A lock-up clutch control method for controlling a lock-up clutch installed in a torque converter interposed between an engine and a transmission used with a vehicle, comprising:

detecting a vehicle speed;

determining whether or not the vehicle speed is equal to or larger than a first threshold value (V1) corresponding to a lock-up ON vehicle speed;

commanding a differential pressure generating device to engage the lock-up clutch, when the vehicle speed is equal to or larger than the first threshold value (V1);

determining whether or not the vehicle speed has reached a second threshold value (V2) larger than the first threshold value (V1);

setting a lock-up OFF threshold value (V3/V4) which depends on whether the vehicle speed has reached the second threshold value (V2); and commanding the differential pressure generating device to disengage the lock-up clutch, when the vehicle speed is equal to or less than the lock-up OFF threshold value.

* * * * *